United States Patent [19]

Roman

[11] 3,820,325

[45] June 28, 1974

[54] SPACE VEHICLE

[75] Inventor: Walter G. Roman, Pittsburgh, Pa.

[73] Assignee: Westinghouse Electric Corporation, Pittsburgh, Pa.

[22] Filed: Feb. 5, 1970

[21] Appl. No.: 7,421

[52] U.S. Cl.......................... 60/203, 60/204, 60/228
[51] Int. Cl....................................................... G21d
[58] Field of Search ............. 60/203, 228, 233, 271; 239/265.43

[56] References Cited
UNITED STATES PATENTS

| | | | |
|---|---|---|---|
| 3,049,876 | 8/1962 | Connors.................................. | 60/230 |
| 3,159,968 | 12/1964 | Welles..................................... | 60/228 |
| 3,315,471 | 4/1967 | Dailey et al............................. | 60/233 |
| 3,336,749 | 8/1967 | Rom et al. .............................. | 60/203 |
| 3,534,908 | 10/1970 | Coleman et al......................... | 239/265.43 |

*Primary Examiner*—Samuel Feinberg
*Attorney, Agent, or Firm*—Z. L. Dermer

[57] ABSTRACT

A space vehicle is disclosed in which the payload and propellant tank are driven by nuclear rocket engine having a nuclear reactor for heating the hydrogen propellant fluid. The tank contains the liquid hydrogen propellant fluid which is supplied to the reactor through flexible struts by means of a turbopump. Vector control of the vehicle is effected by angular displacement of the engine with respect to the payload and tank about the center of mass of the engine. The engine is pivoted by deflecting the flexible struts. The rocket engine is of substantially less length than prior-art engines where the angular displacement is effected with the aid of a gimbal ring.

6 Claims, 5 Drawing Figures

3,820,325

SPACE VEHICLE

BACKGROUND OF THE INVENTION

This invention relates to space-vehicles and has particular relationship to directional or vector control of space vehicles driven by rocket engines.

Typically a space vehicle includes a payload, a propellant tank and a rocket engine. The engine projects a heated fluid from the tank through its nozzle and the reaction from the projection of the fluid propels the payload and propellant tank. Vector control is effected by displacing the engine angularly with respect to the propellant tank and payload.

In accordance with the teachings of the prior-art the vehicle includes a gimballing system or the like which is typically located between the propellant tank and the engine and serves as a pivot for the angular displacement of the engine to achieve vector control. This prior-art gimbal apparatus is complex in its structure and operation as it is necessary to cool the gimbal ring and its supporting structure. Where the cooling is effected by the propellant fluid, as is typical, it is necessary that the fluid be conveyed or fed through the gimbal ring, a demand which has complications. In addition the gimbal ring and its cooling mechanism necessarily has substantial length and the engine is then excessively long.

It is an object of this invention to overcome the above-described disadvantages of the prior-art and to provide a vehicle which shall be less complex and whose engine shall be shorter than prior-art engines and in which vector control shall be achieved without the aid of gimbal rings or the like. It is also an object of this invention to provide a method of thrust-vector control for a vehicle having a rocket engine in whose practice the above-described disadvantages of the prior-art shall be overcome.

SUMMARY OF THE INVENTION

In accordance with this invention thrust-vector control of a vehicle driven by a rocket engine is achieved by angular displacing of the engine about flexible struts connected between the propellant tank and engine and serving as pivot. On angular displacement of the engine the struts are deflected and the thrust is applied to the propellant tank and payload in a direction to achieve the desired vector control. The angular displacement is about the center of mass of the engine and the struts may be mounted at angles converging at the center of mass of the engine. The angular displacement is effected by actuators connected between the engine and the propellant tank, the actuators producing angular displacement in directions at right angles to each other. The center of mass of the overall vehicle is typically about 50 feet from the center of mass of the engine and a small angular displacement of the engine produces substantial effective thrust-vector control.

In accordance with this invention the struts perform an additional purpose while serving as pivots for the angular displacement of the engine; the struts also conduct the propellant fluid from the propellant tank to the engine. The engine is a nuclear rocket engine whose nuclear reactor operates to heat hydrogen as the propellant fluid for the engine. The propellant tank contains liquid hydrogen which is pumped through the struts into a plenum over the reactor fuel assembly or core. From the plenum the hydrogen flows by a circuitous cooling path through the reactor and is heated by the reactor and the resulting hot gas is projected from the nozzle producing the thrust. The plenum filled with cold or liquid hydrogen serves as a radiation shield absorbing gamma rays and neutrons and preventing these rays from penetrating to the payload of the vehicle. The demand for additional biological shielding by boron structures (for example, boron stainless steel or aluminum-boron alloy) is thus minimized or even eliminated.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which.

DESCRIPTION OF EMBODIMENT

Figure 1:
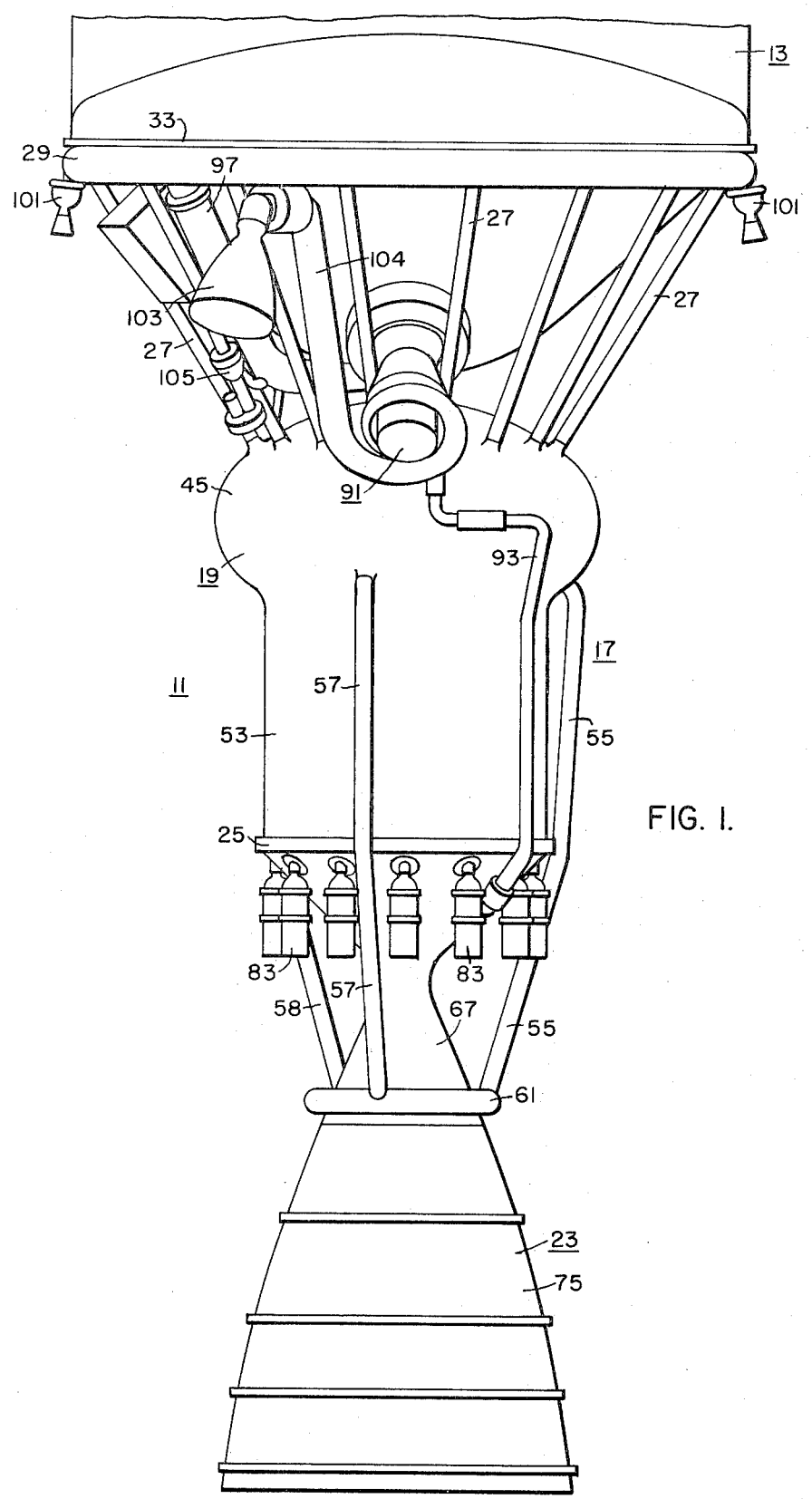
FIG. 1 is a view in front elevation of apparatus according to this invention.

The apparatus shown in the drawings is a vehicle 11 including a payload 13, including the usual cabin (not shown) for personnel and instruments, and a tank 15 containing a propellant fluid, typically liquid hydrogen, and a nuclear rocket engine assembly 17. An anticirculation baffle 18 is interposed between the payload 13 and the tank 15 and engine assembly 17.

The engine assembly is formed of three major components: the pressure vessel 19 with its integral mounting system for the various control components of the engine, the core assembly 21, and the exhaust nozzle 23. The core 21 and the nozzle 23 are connected to the pressure vessel 19 by a single flange connection 25. This connection facilitates removal of the radioactive core 21 and nozzle 23 from the engine structure as a package for service and inspection after tests.

The engine assembly 17 is connected to the payload 13 and tank 15 by a plurality of flexible mounting struts 27 through a torus (hollow circular pipe) 29. Typically there are 16 such struts 27. The struts are suspended from the torus 29 in a conical configuration or pattern, the cone having its apex at the center-of-mass 31 of the engine. The torus 29 is connected to the payload 13 through a flange 33 and serves as a manifold to distribute the hydrogen through the struts 27. The struts 27 have sufficient flexibility to assure that the actuator loads required to angularly displace the engine are within reasonable limits. The struts 27 carry liquid hydrogen and are at a temperature of about 50° Kelvin. The struts 27 must have the necessary flexibility at this low temperature. Suitable material for the struts 27 are the standard nickel chromium steel alloys, aluminum alloys, INVAR alloy and the like. High strength, high ductility titanium alloys may also be used for the struts 27 and pressure vessel 19. Alloys having a ductile-to-brittle transition temperature above about 50°K should be avoided.

The deflection of the engine-assembly 17 about the struts 27 is effected by actuators 41 (only one shown) which work at right angles to each other in a plane perpendicular to the center line 43 of the engine. Each actuates a linkage connected between the head of the pressure vessel 45 and the bottom of the propellant tank 15. The actuators 41 are operable from the control panel (not shown) for the vehicle 11 through servo mechanisms (not shown) and may be controlled by a programmer 109. Movement of the actuators 41 results in angular displacement of the engine assembly 17 and deflection of the struts 27 (see FIG. 4). Typically the elastic mounting structure here disclosed is capable of angular displacement up to about 2°; this is considered adequate for nuclear stage applications.

The pressure vessel 19 typically is fabricated of 606 aluminum, 7039 aluminum or titanium 5% Al 2½ Sn EL1 alloy or the like and includes the dome or head 45, enclosing a plenum chamber 51 for the hydrogen (or other driving or propellant fluid), and a cylindrical wall 53 enclosing the reactor core 21. The lower end of the wall 53 is provided with the flange 25 to which the nozzle 23 is bolted. The pressure vessel includes tubes 55, 57 and 58 connecting the plenum chamber 51 to a torus 61 which constitutes the manifold for the cooling tubes 63 (FIG. 3) of the exhaust nozzle 23.

The exhaust nozzle 23 has a bell-shaped contour and an area ratio typically of about 50 to 1. The nozzle 23 has the inlet tubes 63 into which the propellant (hydrogen) is introduced at an area ratio typically of about 9 to 1 from the torus 61. A portion of the propellant flow is directed through tubes 63 to the aft end of the nozzle 23 and then back through alternate tubes 69 and a greater portion is sent through other tubes 65 directly past the throat 67 of the nozzle. The flow from the tubes 69 and 65 mixes just below the inlet to the reflector 71 of the reactor core 21. Typically there are 222 tubes in the convergent-divergent part (throat 67) ahead (forward) of the manifold 61 and twice that number in the divergent portion 75 aft of the manifold 61. The division of the hydrogen flow is accomplished by the inclusion of a baffle (not shown) in the inlet manifold 61 which diverts sixteen percent typically, of the hydrogen to the divergent end 75 of the nozzle. The passages of the divergent nozzle are manifolded to provide a two-pass flow system.

A typical nozzle 23 operates at a chamber pressure of about 550 psia with approximately 70 pounds per second of hydrogen entering the nozzle at a temperature of 4,090°R. It is estimated that such a nozzle deliver a vacuum specific impulse of 793 seconds at rated conditions.

Where the reactor outlet temperature is about 4,500°R, an appropriate alternate nozzle structure may typically operate at a chamber pressure of 550 psia and a flow of 83 lbs/sec. A typical nozzle 23 can be constructed of Inconel-X alloy (or other high-temperature resistant nickel-base alloy or tantalum of molybdenum) tapered tubing with an 0.008 inch wall thickness and an operating wall temperature at the throat of 1,600°F.

Because of the large diameter-ratio between the reactor 21 exit face and the nozzle throat 67 and because of the thermal radiation at the core 21 exit, the nozzle wall tends to overtemperature in the converging section when thrust is reduced from maximum and full reactor exit temperature is maintained. A heat barrier (not shown) is needed to eliminate this condition if partial power is a requirement.

The reactor core 21 may be of several types, typically KIWI B-1, KIWI B-2 or PHOEBUS. In each of these types there is nuclear fuel 81 in the form of fuel slugs or fuel-bearing graphite modules which have coolant channels for the flow of propellant or are perforated to permit flow of the hydrogen or other propellant. A reflector 71 is provided around the fuel 81. This reflector typically includes an inner reflecting shell (not shown in detail) and an outer reflector (not shown in detail) made up of pillars of beryllium each boxed to receive a rotatable control drum (not shown) of beryllium with boral inserts. The drums are rotatable by rotating mechanisms 83 to control the reactor.

Figure 2:
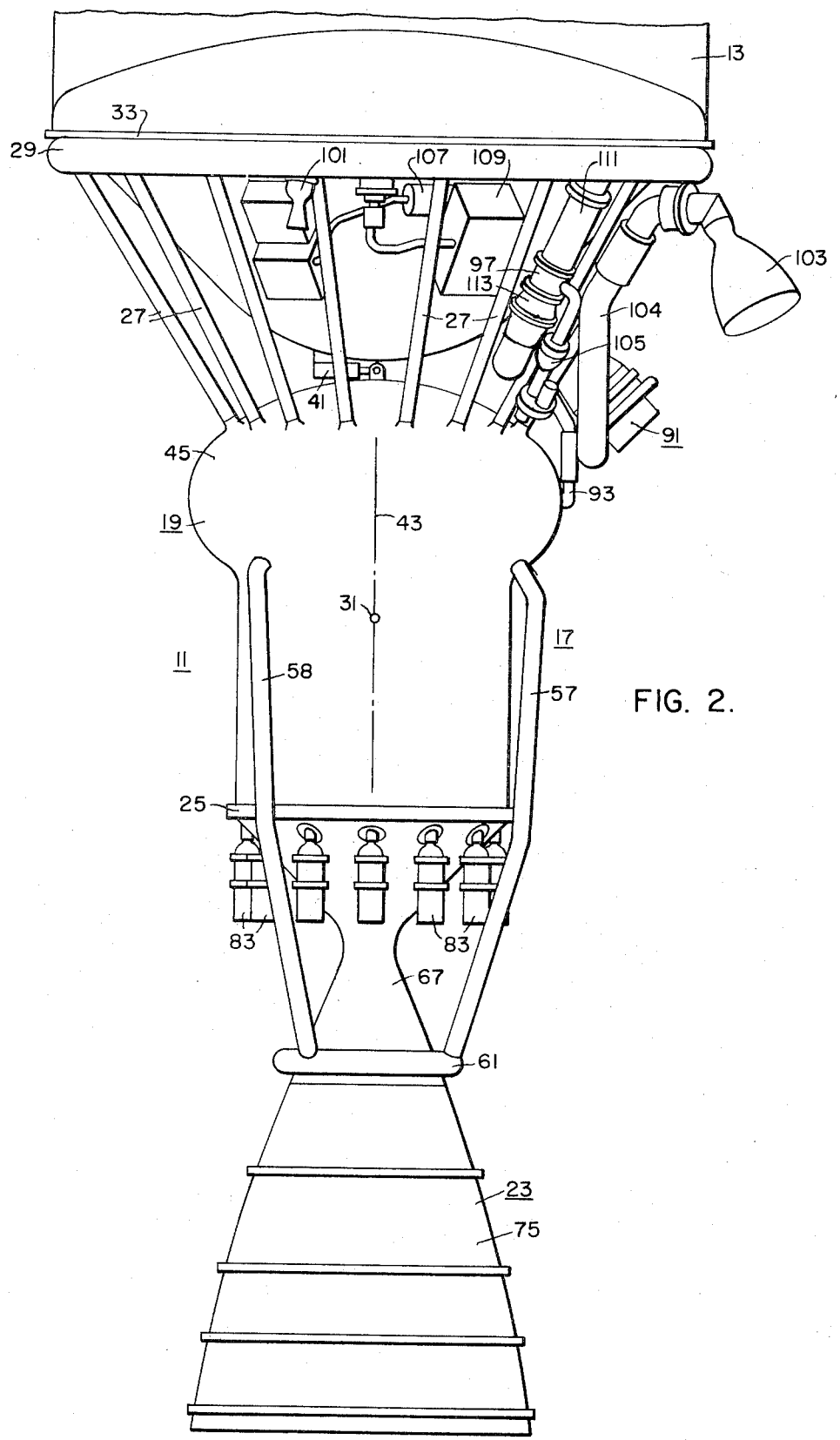
FIG. 2 is a view in side elevation of this apparatus.

The propellant is driven by a turbopump 91 which transmits the propellant under pressure from the tank 15 through the torus 29 and thence through the struts 27 and the remainder of the system. Typically the turbopump 91 is a single stage, centrifugal pump with a gear-driven inducer stage coupled to a 10-stage axial-flow full admission turbine. The pump 91 is driven by the hot propellant delivered through an inlet pipe 93 connected to receive this propellant above the neck 67 of the exhaust nozzle 23. The flow of this propellant is controlled by a turbine-bleed mixing valve 95. The turbopump 91 supplies propellant from the tank 15 to the torus 29 through a tube 97 in which is included a flow meter 111 and a main shut-off valve 113 (shown only in FIG. 2). The valve 95 may be controlled from a programmer (not shown) or the like on the control panel (not shown) of the vehicle.

Figure 3:
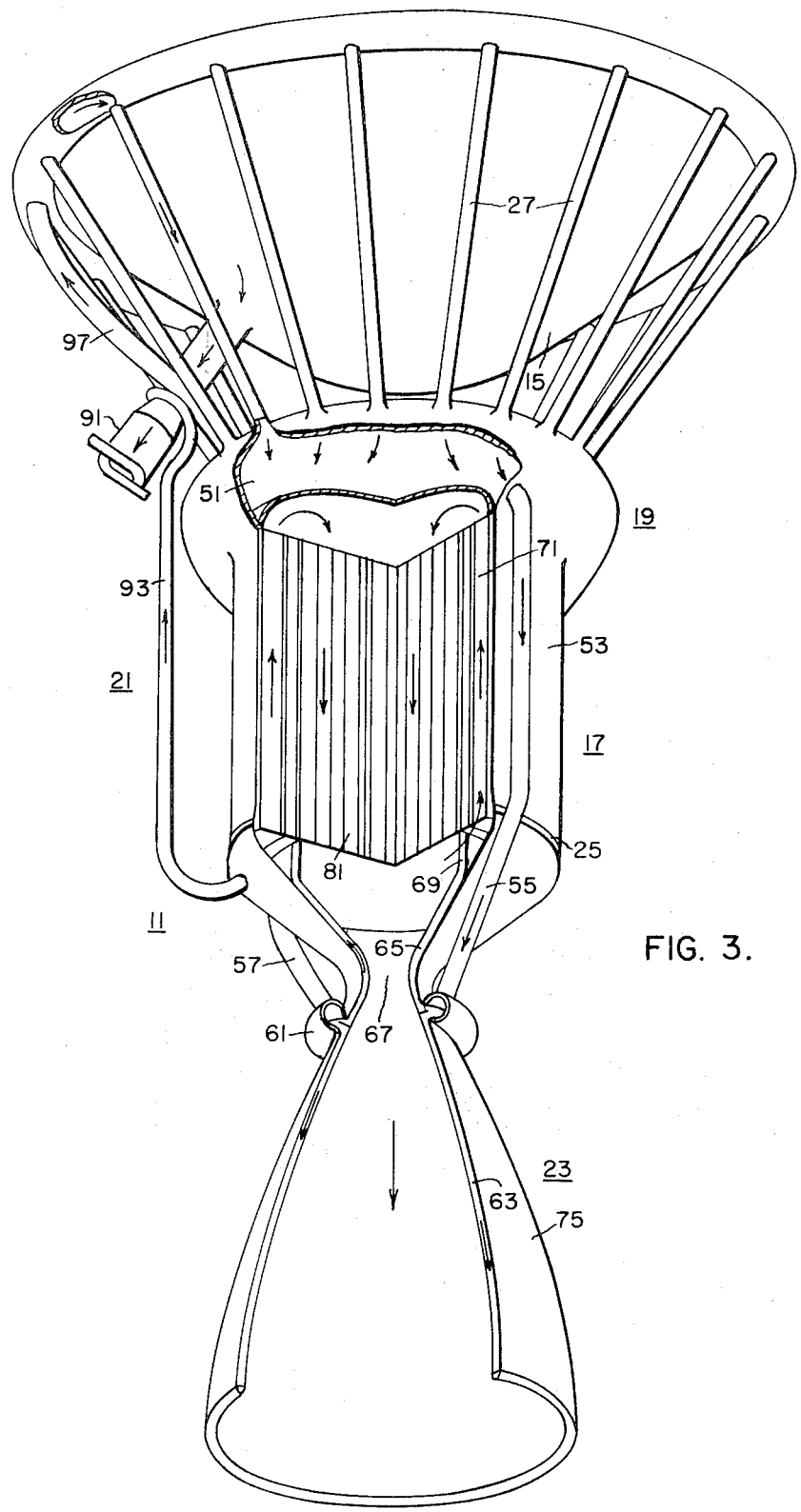
FIG. 3 is a generally diagrammatic view of the apparatus shown in FIGS. 1 and 2, with parts of the cover broken away showing the important parts of apparatus according to this invention and their cooperative relationship.

The arrows in FIG. 3 show the path of the propellant through the engine 19 under the action of the pump 91. The propellant flows from the tank 15, through pump 91 and pipe 97 into torus manifold 29. From the torus 29 the propellant flows through flexible struts 27 into plenum 51 and thence through tubes 55, 57, 58 to the junction of tubes 63 and 65. The propellant flows through tubes 63 aft to the end of nozzle 23 and then back to the junction with the fluid from tubes 65 which flows through the throat 67 of the nozzle 23. There the propellant in the channels 63 and 65 is mixed and flows into and through the reactor where it is heated to a high temperature. The hot propellant flows out of the nozzle propelling the vehicle. The propellant in the plenum 51, when, as usual, it is hydrogen, serves to shield the payload from radioactivity.

Additional components for controlling the vehicle are associated with the above-described appanage. The ullage nozzles 101 are connected through valves (not shown) to the torus 29; the roll-control nozzle 103 is connected through valves (not shown) to the turbine 91 through exhaust pipe 104. The decay-heat valve 105 is connected to the head 45. Neutron detectors 107 and a programmer 109 are suspended from the base of the payload.

To aid those skilled in the art in practicing this invention the following summary is presented.

In accordance with the invention, thrust vector control is achieved by angular displacement of the engine 17 about its center of mass 31. The required angular displacement is achieved by deflection of the flexible struts 27 attaching the engine 17 to the propellant tank 15. This flexible strut system performs the function of gimbals but the flexible struts give this invention marked advantages over a gimbaled engine.

Figure 4:
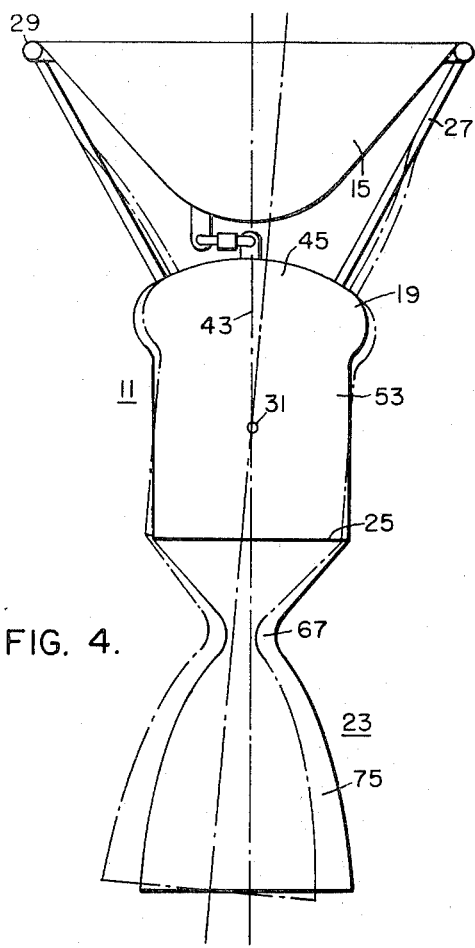
FIG. 4 is a view of the apparatus shown in FIGS. 1 and 2 showing the manner in which angular displacement of the engine takes place, in the practice of this invention, to achieve vector control.
Figure 5:
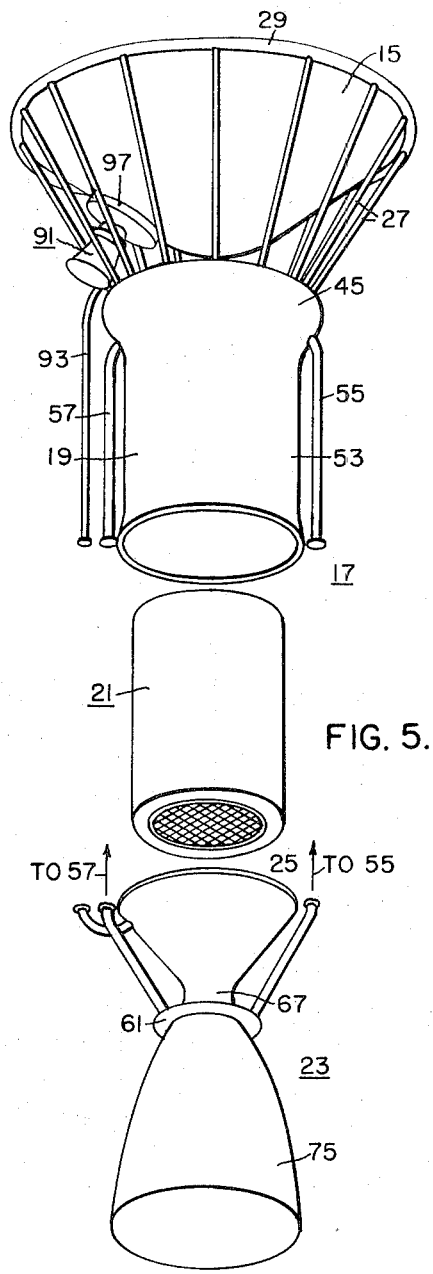
FIG. 5 is an exploded view showing the principal components of the engine of the apparatus shown in FIGS. 1 and 2.

The flexible strut mounting system, typically uses 16 small-diameter pipes 27, typically 2.00 in. OD with 0.1 in. wall thickness, as mounting struts. These struts, which are also used to transfer hydrogen or other propellant to the engine, are arranged as surface elements of a cone whose apex is at the center of mass 31 of the engine 17. Two actuators 41 working at right angles in a plane normal to the center line 43 of the vehicle 11 are connected to the head 45 of the reactor vessel 19 and to the bottom of the main propellant tank 15. Movement of the actuators 41 results in angular displacement of the engine about its center of mass and deflection of the mounting struts, as shown in FIG. 4.

Typically the vehicle center of gravity is approximately 50 feet from that (31) of the engine 17 and a small angular displacement of the engine provides significant thrust vector control. For example, at 55,000 pounds thrust, displacement of the engine through an angle of slightly less than 1° provides 45,000 lb. ft. of thrust vector control. This is adequate for a typical nuclear stage and therefore this capability is built into the system. To allow for larger engines, the mounting structure may be constructed for angular displacement up to 2°. Thrust vector control can then be doubled by increasing the size of the actuators 41.

FIG. 3 shows the flow path through the mounting system (27) as well as through other parts of the engine 17. The pump discharge line 97 is connected to a torus 29, which is joined to the vehicle by means of a bolted flange 33. In addition to transmitting engine thrust to the vehicle 11, the torus 29 serves as a manifold to distribute pump discharge hydrogen into the 16 struts 27. Hydrogen flows through the struts 27 into a plenum chamber 51 under the head 45 of the reactor vessel 19. The prime function of this chamber is to provide a shield of dense hydrogen to reduce radiation heating of the propellant in the main tank 15. The plenum chamber 51 also serves as a manifold to collect pump discharge hydrogen from the struts before it is transmitted to the cooled exhaust nozzle 23 through external lines 55, 57, 59.

The flexible strut mounting system is a simple, lightweight, reliable means of providing thrust vector control. Because pump discharge fluid is transferred through the mounting system (27), problems associated with transferring high-pressure hydrogen from the tank-mounted pump to the engine and cooling the mounting structure have been eliminated. Leakage has been minimized by eliminating bolted flanges wherever possible and by combining functions.

For analysis the 16 flexible struts 27 which join the engine pressure vessel 19 to the torus 29 are assumed to be perfectly built-in at each end. The high pressure fluid columns in the struts 27 support 52 percent of the engine thrust. The remaining thrust is carried as column loads by the struts 27. In addition to column loads, the struts are constructed to carry loads imposed on the mount system during angular displacement of the engine. If the struts are analyzed as beam columns the loads imposed on them during engine operation are well below the yield strength of the available materials used.

The struts 27 are also constructed to support engine acceleration loads during periods of booster operation. Assuming a structure of titanium alloy EL1, the maximum peak stresses in the struts 27, assuming 1° angular displacement of the engine and 70,000 lbs. thrust, are 47,900 psi axially and 24,100 psi hoop (hoop stress is the stress tangentially of a strut tending to burst it). As a result, the maximum shear stress, which occurs in the strut near its point of attachment to the pressure vessel 19 is 36,000 psi. The alternating shear stress corresponding to the above conditions is 18,600 psi.

The alternating stresses in the titanium alloy pressure vessel head 45 and in the torus 29 due to 1° angular displacement of the engine are low. The thickness of the vessel head is usually increased at the point of strut 27 attachment. The peak stress in the head is less than 130,000 psi and the alternating portion of the stress is only 15,000 psi. Stresses in the torus 29 are lower than those in the pressure vessel head.

Stresses in the mounting system during booster operation are relatively low. The stresses in the struts are 20,400 psi and in the ellipsoidal head are 35,200 psi during 8g accelerations of the booster.

The yield strength of the titanium alloy which can be used for struts 27 is 210,000 psi and the notched ($K_t = 6$) fatigue endurance limit is 40,000 psi at 50°R. For the few hundred cycles of maximum angular displacement expected during the life of an engine 17, the allowable alternating stresses can actually approach the yield strength of the material. In addition, the calculation method used for determining stresses in the mounting system is conservative because of the initial assumption that the strut ends are perfectly build-in. Local deflections and rotation of the torus 29 and ellipsoidal head will cause these stresses to be lower than was calculated. Thus, the flexible strut mounting system appears to be conservatively designed for its application.

Because the entire mounting structure is isothermal, (at the temperature of liquid hydrogen 50°K) differential temperature problems are avoided during engine operation. Provisions made in the hydrogen flow systems to prevent thermal shock of the core at starting, or over-temperature during shutdown, will limit transient temperature gradients in the reactor vessel and fluid transfer pipes to acceptable levels. Nevertheless, additional steps are taken to ensure freedom from thermal shock. For example, the thickness of all materials is reduced to a minimum, consistent with reliability, and abrupt changes in section are avoided. The titanium alloy which can be used for the reactor vessel 19, mounting system, and piping, has both a low coefficient of thermal expansion and a low modulus of elasticity, which reduces stresses for given differential temperatures. In addition, the alloy has high ductility, which makes it resistant to damaging thermal stresses.

The turbine exhaust is piped to a roll control nozzle 105 (FIG. 1). Nozzle mounting provisions are designed to compensate for differential temperatures between the exhaust pipe and engine structure.

In the flexible strut mounting system, the turbine inlet line 93 must compensate for angular displacement of the engine relative to the turbine, and for differential expansions from thermal gradients. Flexible sections (bellows) may be provided in this line to assure the necessary flexibility.

While a preferred embodiment has been disclosed herein, many modifications thereof are feasible. This invention is not to be restricted except insofar as is necessitated by the spirit of the prior art.

I claim as my invention:

1. A vehicle including a payload, propellant tank and rocket engine, elongated flexible struts connecting the propellant tank to the rocket engine, each of said struts being rigidly and fixedly secured at its ends respectively to said tank and said engine and means, connected to said rocket engine and propellant tank, for pivoting said engine with respect to said tank by deflection of said struts laterally with respect to the longitudinal axes thereof, to provide thrust vector-control of said vehicle by angular displacing of the engine with respect to said payload and propellant tank.

2. The vehicle of claim 1 wherein the struts are arrayed in a generally conical array, said conical array having its apex approximately at the center of mass of said engine, and the angular displacement is about said center of mass.

3. The vehicle of claim 1 wherein said struts convey the propellant from said tank to said engine.

4. The vehicle of claim 1 wherein the center of gravity the vehicle including payload, propellant tank and engine is a long distance from the center of gravity of the engine.

5. The vehicle of claim 2 wherein the engine is a nuclear engine including a nuclear reactor and the struts are each connected at one end thereof to a plenum in communication with the reactor to which the struts convey the propellant and further wherein the propellant is hydrogen so the said plenum containing hydrogen shields the remaining vehicle parts from neutrons and other radioactive rays of said reactor.

6. The method of providing thrust vector control for a vehicle propelled by a rocket engine actuated by a fluid propellant from a propellant tank which comprises supplying said propellant to said engine through a plurality of elongated flexible struts rigidly connected at their ends respectively to said tank and engine and in propellant communicating relationship between said tank and engine, and pivoting said engine with respect to said tank by deflection of said struts laterally with respect to the longitudinal axes of said struts, respectively.

* * * * *